Patented Oct. 4, 1949

2,483,701

UNITED STATES PATENT OFFICE 2,483,701

POLISHING COMPOSITION

Thomas G. Hawley, Jr., Bernard J. Kummer, and John W. Barnes, Jr., Chicago, Ill., assignors to The Diversey Corporation, a corporation of Illinois No Drawing. Application February 26, 1947, Serial No. 731,048

7 Claims. (Cl. 260—22)

This invention relates to a polishing composition and particularly to a wax emulsion adapted to be applied to a surface and to the wax composition after it has been applied to said surface.

We have found that wax emulsions including carnauba and similar waxes may be considerably improved by the inclusion of certain maleic anhydride modified glycerol-rosin esters.

Wax emulsions of the prior art have included rosin, dammar gums, copal resins, glycerol-rosin esters and the like together with various soaps and emulsifying agents, but none of these compositions have been completely satisfactory for a number of reasons. Various degrees of cloudiness resulting from partial incompatibility of the components result in translucent to opaque coatings. Other faults are lack of water resistance, hardness, gloss and the like. Efforts to overcome these faults have included the use of mutual solvents, such as naphtha, turpentine, alkaline compounds such as borax, ammonia, and the like.

We have now found that by careful selection of the components and proper formulation, the above faults can be overcome and a coating produced which is clear, water resistant, wear resistant, hard, and of high gloss.

Further, the emulsions here produced are highly stable over long storage periods.

The wax component of the emulsion is preferably carnauba wax, though similar type waxes or substitutes such as beeswax, ouri couri, and candellila waxes may be used to replace part or all of the carnauba wax. These waxes may be used either singly or in combination with each other.

The type of the resin component in the emulsion is quite important in order to avoid the necessity of providing a mutual solvent to render the wax and resin compatible. The inclusion of a mutual solvent, such as naphtha, is undesirable because of its tendency to produce unstable emulsions as well as to increase the proportion of emulsifying agents required. We have found that a rosin-maleic anhydride-glycerol resin will satisfactorily blend with carnauba wax to give a composition which is easily emulsified without the aid of a solvent, provided the proportions of the resin components are carefully controlled. Satisfactory resins were found to come within the following range of composition:

| Per cent Rosin | Per cent Maleic Anhydride | Per cent Glycerine |
|---|---|---|
| 86.0 to 72.8 | 5.0 to 14.1 | 9.0 to 13.1 |

These resins were prepared by heating ordinary wood rosin to 190–200° C., then adding the maleic anhydride and heating to about 240° C. over a period of approximately 20–30 minutes, after which the glycerine was added, and the mixture cooked at 240–270° C. for 2 to 5 hours or until the acid number was reduced to about 46–47. The resin mass was then heated for about an hour at approximately 300–310° C. to drive off any excess uncombined glycerine and cause a further reduction of the acid number.

In compounding of the emulsified wax polishing composition, oleic acid and monoethanolamine are employed as the emulsifying agents. Other organic amines such as di- and triethanolamines, morpholine, and the like may be used with the oleic acid. The amount of these agents required will vary only slightly with the proportion of maleic anhydride employed in the resins of the above range of composition, but rapidly increases as the proportion of maleic anhydride in the resin decreases below 5%. In the case of resins within the designated range, the combined amounts of oleic acid and monoethanolamine will range from 20–22% of the weight of the combined wax and resin, whereas with lower amounts of maleic anhydride in the resin, the amount of emulsifying agents rapidly increases to about 50% when no maleic anhydride is used. Commercial oleic acid compounds such as "red oil" may be satisfactorily employed. The amount of amine varies between 50 and 65 per cent by weight of the oleic acid.

In one example of preparing the wax emulsion of this invention, the following ingredients were used in the following proportions:

|  | Per cent |
|---|---|
| Carnauba wax | 6.10 |
| Resin | 4.05 |
| Oleic acid | 1.80 |
| Monoethanolamine | 1.05 |
| Water (deionized or distilled) | 87.00 |
|  | 100.00 |

The resin employed in the above composition may range in composition from

|  | Per cent |
|---|---|
| Rosin | 86.0 |
| Maleic anhydride | 5.0 |
| Glycerine | 9.0 | to

|  | Per cent |
|---|---|
| Rosin | 72.8 |
| Maleic anhydride | 14.1 |
| Glycerine | 13.1 | the preferred composition corresponding substantially to the latter proportions.

In making the finished emulsified wax composition, the wax and resin are melted together at about 325° F., then cooled to about 225° F. and the oleic acid added, and the mass stirred until it is homogeneous. The batch is then cooled slowly with stirring to 205-210° F. and the monoethanolamine added. About 50% of the water previously heated to 205-210° F. is added to the melt with continued stirring, holding the temperature at about 200° F. until the solids are completely emulsified. The emulsion is then further diluted with the remaining 50% of water with the water being at room temperature and the emulsion cooled to about 90-100° F. before packaging.

A resin of the preferred composition was made up having a melting point of 290° F. and an acid number of 37. This resin was employed in a composition corresponding to the designated emulsion formula. The resulting emulsion was stable against changes in temperature between 32 and 120° F. The emulsion was transparent, whereas emulsions employing resins modified with less than 5% of maleic anhydride are white and opaque. The emulsion was readily applied to surfaces of wood, asphalt tile, rubber tile, linoleum, and the like, to produce clear, uniform glossy coatings without the necessity of rubbing or polishing by mechanical means. The coating film was hard, highly resistant to abrasion and water spotting or streaking.

When testing the films on black glass, no haze or cloudiness was observed showing complete compatibility of the emulsion components.

When testing the coating film for tackiness by applying a piece of kraft paper with finger pressure, the film exhibited no tackiness whereas films produced when employing resins containing less than 5% maleic anhydride showed a marked degree of tackiness.

The solid components of the emulsion, based on the weight of the total solids, may be varied within the following ranges:

| | Per cent |
|---|---|
| Resin | 23-39 |
| Wax | 39-54 |
| Oleic acid | 12-16 |
| Monoethanolamine | 7-9 |

If the resin content goes below 23%, the coating tends to become too slippery, and if it goes above 39% the coating is too brittle. With wax contents above 54%, the coating is too slippery, and below 39% the coating is too brittle. If the oleic acid and the monoethanolamine vary outside of the stated limits, the resulting emulsion becomes unstable, except in the case where both go above the upper limit together, in which case the coating becomes too soft.

The precentage of total solids in the emulsion can vary from 6% to 25%. Above 25% an emulsion is not formed, and below 6% the amount of wax is insufficient to give a satisfactory coating.

Having described our invention as related to certain embodiments thereof, it is our intention that the invention be not limited by any of the details of description unless otherwise specified, but rather be construed broadly within its spirit and scope as set out in the accompanying claims.

We claim:

1. The wax coating of claim 7 wherein the wax is carnauba wax.

2. The wax coating of claim 7 wherein the amine is monoethanolamine.

3. The method of making a wax composition which comprises mixing by weight of the composition, about 6.10% of a wax, about 4.05% of a rosin-maleic anhydride-glycerine resin containing from 72.8 to 86.0% by weight of rosin, 5.0 to 14.1% of maleic anhydride and 9.0 to 13.1% glycerine, and about 1.80% of oleic acid, heating and stirring to blend the mass into a homogenous mixture, adjusting the temperature to about 205-210° F., adding about 1.05% monoethanolamine, adding about 43% water at about 205-210° F., stirring while holding the temperature at approximately 200° F. until the solids are completely emulsified, and adding about 44% water at room temperature and cooling the emulsion.

4. A wax emulsion comprising from, by weight, about 75 to 94% water and about 6 to 25% of solids, said solids comprising a blended mixture based on the total weight of the solids of about 39 to 54% of a wax, about 12 to 16% of oleic acid, about 7 to 9% of an amine, and about 23 to 39% of a resin comprising from about 72.8 to 86.0% by weight of rosin, about 5.0 to 14.1% maleic anhydride and about 9.0 to 13.1% glycerine, said emulsion being characterized by the absence of solvents for either the resin or the wax.

5. A wax emulsion coating composition essentially consisting of, by weight, about 6.1% carnauba wax, about 1.8% oleic acid, about 1.05% monoethanolamine, about 4.05% of a resin containing from about 5 to 14.1% maleic anhydride, 86 to 72.8% rosin and 9 to 13.1% glycerine, and about 87% water.

6. A wax emulsion coating composition essentially consisting of, by weight, about 6.1% carnauba wax, about 1.8% oleic acid, about 1.05% monoethanolamine, about 4.05% of a resin containing 14.1% maleic anhydride, 72.8% rosin and 13.1% glycerine, and about 87% water.

7. A clear wax composition coating comprising a wax, oleic acid, an amine, and a resin containing from about 5 to 14.1% maleic anhydride, 86 to 72.8% rosin and 9 to 13.1% glycerine.

THOMAS G. HAWLEY, Jr.
BERNARD J. KUMMER.
JOHN W. BARNES, Jr.

REFERENCES CITED

The following references are of record in the file of this patent:

UNITED STATES PATENTS

| Number | Name | Date |
|---|---|---|
| 2,063,542 | Ellis | Dec. 8, 1936 |
| 2,211,913 | Ryan | Aug. 20, 1940 |
| 2,257,595 | Danielson | Sept. 30, 1941 |
| 2,272,057 | Cheetham | Feb. 3, 1942 |
| 2,346,124 | Dew | Apr. 4, 1944 |
| 2,441,953 | Berry et al. | May 25, 1948 |